United States Patent
Lee et al.

(10) Patent No.: US 9,858,629 B2
(45) Date of Patent: Jan. 2, 2018

(54) METHOD AND SYSTEM FOR DETERMINING AFFILIATION OF FOREIGN PAYMENT CARD HOLDERS WITH DOMESTIC EDUCATIONAL INSTITUTIONS

(71) Applicant: MASTERCARD INTERNATIONAL INCORPORATED, Purchase, NY (US)

(72) Inventors: Edward M. Lee, Scarsdale, NY (US); Tong Zhang, Greenwich, CT (US); Qian Wang, Ridgefield, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 545 days.

(21) Appl. No.: 14/542,984

(22) Filed: Nov. 17, 2014

(65) Prior Publication Data

US 2016/0140556 A1    May 19, 2016

(51) Int. Cl.
  *G06Q 50/20* (2012.01)
  *G06Q 40/00* (2012.01)
  *G06Q 20/34* (2012.01)
  *G06Q 20/20* (2012.01)

(52) U.S. Cl.
  CPC ............. *G06Q 50/20* (2013.01); *G06Q 20/20* (2013.01); *G06Q 20/34* (2013.01)

(58) Field of Classification Search
  CPC ........ G06Q 10/00; G06Q 20/00; G06Q 30/00; G06Q 40/00
  USPC ..................................................... 705/3–44
  See application file for complete search history.

(56) References Cited

U.S. PATENT DOCUMENTS

| | | | |
|---|---|---|---|
| 6,179,206 B1* | 1/2001 | Matsumori | G06Q 20/343 235/375 |
| 8,924,295 B2* | 12/2014 | Aaron | G06Q 20/24 705/44 |
| 2005/0203765 A1* | 9/2005 | Maritzen | G06Q 20/10 705/26.1 |
| 2011/0040655 A1* | 2/2011 | Hendrickson | G06Q 30/02 705/27.1 |
| 2011/0112964 A1* | 5/2011 | Berntsen | G06Q 20/10 705/44 |

(Continued)

*Primary Examiner* — Frantzy Poinvil
(74) *Attorney, Agent, or Firm* — Ohlandt, Greeley, Ruggiero & Perle, L.L.P.

(57) ABSTRACT

A method and a system are provided determining affiliation of foreign payment card holders (e.g., students) with domestic educational institutions (e.g., universities and colleges). In particular, the present disclosure provides a method and a system for assessing the relative degree of proximity of the residential geolocation of the foreign payment card holders and the geolocation of the domestic educational institutions to facilitate determining whether the foreign payment card holders are affiliated with the domestic educational institutions, and also for assessing purchasing and payment behavior of the foreign payment card holders at domestic merchants. Predictive behavioral profiles are generated based on the purchasing and payment activities and shopping patterns of the foreign payment card holders by date at the domestic merchants, and the relative degree of proximity of the residential geolocation of the foreign payment card holders with the geolocation of the domestic educational institutions.

23 Claims, 8 Drawing Sheets

(56) References Cited

U.S. PATENT DOCUMENTS

2013/0041781 A1* 2/2013 Freydberg .............. G06Q 50/01
                                                  705/27.1
2013/0151388 A1   6/2013 Falkenborg et al.
2014/0214566 A1* 7/2014 High ................ G06Q 20/0453
                                                  705/17
2015/0026066 A1* 1/2015 Aaron .................... G06Q 20/24
                                                  705/44

* cited by examiner

| AUTOMOTIVE FUEL (AFS) | GROCERY STORES (GRO) | EATING PLACES (EAP) | ACCOMODATIONS (ACC) |
|---|---|---|---|
| SHELL | KROGER | MCDONALD'S | HOLIDAY INN |
| EXXONMOBIL | PUBLIX SUPER MARKETS | SUBWAY | HAMPTON INN HOTELS |
| BRITISH PETROLEUM / BP | TRADER JOE'S MARKET | WENDY'S | BEST WESTERN / BEST WESTERN HOTELS |
| CHEVRON | WHOLE FOODS MARKET | BURGER KING | MARRIOTT |
| SUNOCO | SAFEWAY | TACO BELL | HILTON |
| CITGO | STOP & SHOP | STARBUCKS | DAYS INN |
| MARATHON | H-E-B GROCERY/ H-E-B | KENTUCKY FRIED CHICKEN | DISNEY RESORTS |
| 7-ELEVEN | FOOD LION | PIZZA HUT | HOLIDAY INN EXPRESS |
| VALERO | SHOP-RITE | DUNKIN DONUTS | COMFORT INN |
| CONOCO | KANGAROO | CHICK-FIL-A | COURTYARD BY MARRIOTT |
| SPEEDWAY | GIANT EAGLE | PANERA BREAD / ST LOUIS BREAD COMPANY | SUPER 8 MOTELS |
| MURPHY USA | GENERAL NUTRITION CENTER / GNC | APPLEBEE'S | SHERATON / SHERATON HOTELS |
| PILOT TRAVEL CENTERS | WEGMANS | ARBY'S | DOUBLETREE |
| HESS EXPRESS | SAVE A LOT | DAIRY QUEEN | LA QUINTA INNS |
| GULF OIL | WINN-DIXIE | SONIC AMERICA'S DRIVE IN | QUALITY INN |

FIG. 4

| Card | Time Span Between First and Last Seen in the US | Country of Issuance | Confidence of Being a Student |
|---|---|---|---|
| Card 1 | 12 months | China | High |
| Card 2 | 2 years | Great Britain | High |
| Card 3 | 1 week | Germany | Low |
| Card 4 | 4 months | Japan | Medium |
| Etc. | | | |

FIG. 7

| Card | Amount of Transaction | Merchant Name | Merchant Zip | Industry | Country of Issuance |
|---|---|---|---|---|---|
| Card 1 | 20 | Merchant 1 | 10002 | Groceries | China |
| Card 1 | 15 | Merchant 2 | 10009 | Apparel | China |
| Card 1 | 230 | Merchant 3 | 10002 | Jewelry | China |
| Card 2 | 54 | Merchant 1 | 90210 | Groceries | Great Britain |
| Card 2 | 23 | Merchant 2 | 90209 | Apparel | Great Britain |
| Card 2 | 21 | Merchant 1 | 90210 | Groceries | Great Britain |
| .... | | | | | |

FIG. 8

METHOD AND SYSTEM FOR DETERMINING AFFILIATION OF FOREIGN PAYMENT CARD HOLDERS WITH DOMESTIC EDUCATIONAL INSTITUTIONS

BACKGROUND OF THE DISCLOSURE

1. Field of the Disclosure

The present disclosure relates to a method and a system for determining affiliation of foreign payment card holders (e.g., students) with domestic educational institutions (e.g., universities and colleges). In particular, the present disclosure relates to a method and a system for assessing the relative degree of proximity of the residential geolocation of the one or more foreign payment card holders and the geolocation of the one or more domestic educational institutions to facilitate determining whether the one or more foreign payment card holders are affiliated with the one or more domestic educational institutions, and also for assessing purchasing and payment behavior of the one or more foreign payment card holders at one or more domestic merchants.

2. Description of the Related Art

As more and more foreigners are now living in the United States, either on a temporary or permanent basis, there exists an opportunity for domestic merchants to market to this large segment of the population. In particular, there are more and more foreign students now studying at United States educational institutions (e.g., universities and colleges). As such, there exists an opportunity for domestic merchants to market to the foreign students as well as to nurture a potential retention of these students as future customers.

For many domestic merchants, there is a lack of specific metrics and understanding of their foreign shoppers (e.g., foreign payment card holders particularly students) residing in the United States. As a result, the ability to better serve the foreign shoppers in terms of language and culture of the foreign shoppers for specific stores/merchants can arise. Moreover, there can be missed opportunities to attract additional foreign shopper spend by further understanding of the overall foreign shopper profile in terms of advertising and planning.

Domestic merchants have an interest in knowing, for their particular geographical area, where foreign shoppers residing in the United States are coming from and what they are buying. Information useful to such merchants can include, for example, where foreign shoppers are coming from; whether foreign shoppers are spending more or less in a particular area/place/industry in comparison to a competing area/place/industry and, if so, how much; what foreign shoppers are spending on including which industries and merchants; when foreign shoppers are buying and what times foreign shoppers are buying; whether there is seasonality involved with the foreign shopper trade in a particular geographical area; and the like.

With such information, a domestic merchant, for example, can focus advertising towards certain countries to increase foreign shopper flow and transactions. To appeal to potential foreign shoppers from the most popular countries of origin, a domestic merchant can enhance the foreign shopper experience with language, customs, food, brochures, and the like, for those particular popular countries. Also, such information would allow domestic merchants to plan according to foreign shopper arrival seasonality at a particular destination site.

Promoting and marketing expenses are often one of the largest cost categories for a merchant. Promoting and marketing difficulties in effectively capturing and reaching the correct population of shoppers, is an industry wide challenge, regardless of shopper destination sites or the goods or services offered. In an attempt to overcome these difficulties, entities often engage in various promoting and advertising techniques to a broad shopper audience hoping to reach interested shoppers. However, such broad promoting and advertising techniques are often ignored by potential shoppers, or fail to reach the intended shopper audience.

Information on potential foreign shoppers can be very important to sellers of goods and services. Domestic merchants benefit from having detailed information about buying interests or capacities of potential purchasers of goods or services. If a domestic merchant, for instance, can identify and selectively promote or advertise to those potential foreign shoppers who fit a profile of probable purchasers of the domestic merchant's goods or services, the domestic merchant can reduce advertising costs by advertising directly to those potential foreign shoppers. In other words, if the domestic merchant has both information about potential foreign shoppers and more targeted access for its messages, it can achieve more foreign purchasers/customers for the same amount of money. Useful financial and demographic information for such a strategy includes a potential foreign shopper's financial status, age, residence, and interests in various goods and services.

If a domestic merchant has access to such financial and demographic information about a potential foreign shopper, the domestic merchant can selectively market to the more promising foreign shoppers for a decreased expense per sales transaction. The money saved by the domestic merchant can, potentially, be used to reduce the price of the good or service to the foreign shopper. Instead of advertising to the masses of potential foreign shoppers, the domestic merchant can concentrate on specific potential foreign shoppers who may be likely to visit a particular destination site or to buy a specific good or service and/or offer a favorable pricing.

Using relevant data, foreign shopper activities and characteristics typically provide an effective form of targeted marketing by creating an experience that is personalized and relevant to the foreign shopper. However, targeted promoting and marketing systems are often limited to accessing only a specific set of data that provides less than a holistic view of a foreign shopper's spending habits and preferences.

Businesses and merchants are constantly seeking ways to operate in an environment where they are able to deliver promotional and advertising messages and offers to their target audience at the opportune time. For many, the best time for reaching potential foreign shoppers is at a time when the potential foreign shopper is online website browsing for shopping opportunities at a particular destination. At other times, the most ideal scenario for a foreign shopper to receive advertisements and offers is when they are physically at the destination. In such instances, there is a need to provide targeted advertising messages and offers to foreign shoppers at the right place, to enhance the sale of goods and services to potential foreign shoppers.

Therefore, a need exists for a system that can provide a more effective form of targeted promoting or marketing to foreign shoppers particularly foreign payment card holders (e.g., students). A more holistic view of a foreign payment card holder's personal circumstances, including education, spending habits, country of origin and associated language and customs, is needed for effective promoting and targeted marketing. Further, a need exists for a system that can analyze a foreign payment card holder's personal circumstances and identify shopping activities and circumstances that can represent an opportunity for a domestic merchant to offer products or services to the foreign payment card holder, and that are specifically tailored to the foreign payment card holder's upcoming need or desire, as well as communicate the offers to the foreign payment card holder.

SUMMARY OF THE DISCLOSURE

The present disclosure provides a method and a system for determining affiliation of foreign payment card holders with domestic educational institutions. In particular, the present disclosure relates to a method and a system for assessing the relative degree of proximity of the residential geolocation of the one or more foreign payment card holders and the geolocation of the one or more domestic educational institutions, to facilitate determining whether the one or more foreign payment card holders are affiliated with the one or more domestic educational institutions, and also for assessing purchasing and payment behavior of the one or more foreign payment card holders at one or more domestic merchants.

The present disclosure also provides a method that involves retrieving from one or more databases a first set of information comprising payment card transaction information attributable to one or more foreign payment card holders; retrieving from one or more databases a second set of information comprising domestic merchant information of one or more domestic merchants; and retrieving from one or more databases a third set of information comprising domestic educational institution information of one or more domestic educational institutions. The method also includes analyzing the first set of information and the second set of information to identify purchasing and payment activities of the one or more foreign payment card holders by date at the one or more domestic merchants; identifying shopping patterns of the one or more foreign payment card holders at the one or more domestic merchants based on the purchasing and payment activities of the one or more foreign payment card holders by date at the one or more domestic merchants; determining residential geolocation of the one or more foreign payment card holders based on the shopping patterns of the one or more foreign payment card holders at the one or more domestic merchants; and analyzing the third set of information to identify geolocation of the one or more domestic educational institutions. The method further includes comparing residential geolocation of the one or more foreign payment card holders with geolocation of the one or more domestic educational institutions to determine a relative degree of proximity of the one or more foreign payment card holders with the one or more domestic educational institutions; and assessing the determined relative degree of proximity to facilitate determining whether the one or more foreign payment card holders are affiliated with the one or more domestic educational institutions.

In an embodiment, the method includes analyzing the first set of information and the second set of information to identify one or more categories of domestic merchants based on domestic merchant line of business with the one or more categories of domestic merchants associated with the purchasing and payment activities of the one or more foreign payment card holders; and assessing purchasing and payment behavior of the one or more foreign payment card holders at one or more domestic merchants based on the purchasing and payment activities of the one or more foreign payment card holders and the one or more categories of domestic merchants.

The present disclosure further provides a method for targeting information including at least one or more suggestions or recommendations for foreign payment card holder spending or purchasing activity at one or more domestic merchants, based on the shopping patterns of the one or more foreign payment card holders at the one or more domestic merchants.

The present disclosure yet further provides a system that includes one or more databases configured to store a first set of information comprising payment card transaction information attributable to one or more foreign payment card holders; one or more databases configured to store a second set of information comprising domestic merchant information of one or more domestic merchants; and one or more databases configured to store a third set of information comprising domestic educational institution information of one or more domestic educational institutions. The system includes a processor configured to: analyze the first set of information and the second set of information to identify purchasing and payment activities of the one or more foreign payment card holders by date at the one or more domestic merchants; and identify shopping patterns of the one or more foreign payment card holders at the one or more domestic merchants based on the purchasing and payment activities of the one or more foreign payment card holders by date at the one or more domestic merchants. The processor is also configured to: determine residential geolocation of the one or more foreign payment card holders based on the shopping patterns of the one or more foreign payment card holders at the one or more domestic merchants; and analyze the third set of information to identify geolocation of the one or more domestic educational institutions. The processor is further configured to: compare residential geolocation of the one or more foreign payment card holders with geolocation of the one or more domestic educational institutions to determine a relative degree of proximity of the one or more foreign payment card holders with the one or more domestic educational institutions; and assess the determined relative degree of proximity to facilitate determining whether the one or more foreign payment card holders are affiliated with the one or more domestic educational institutions.

In an embodiment, the processor is also configured to: analyze the first set of information and the second set of information to identify one or more categories of domestic merchants based on domestic merchant line of business with the one or more categories of domestic merchants associated with the purchasing and payment activities of the one or more foreign payment card holders; and assess purchasing and payment behavior of the one or more foreign payment card holders at one or more domestic merchants based on the purchasing and payment activities of the one or more foreign payment card holders and the one or more categories of domestic merchants.

In an embodiment, the processor is also configured to target information including at least one or more suggestions or recommendations for foreign payment card holder spending or purchasing activity at one or more domestic merchants, based on the shopping patterns of the one or more foreign payment card holders at the one or more domestic merchants.

The present disclosure further provides a method for generating one or more predictive behavioral profiles. The method includes retrieving from one or more databases a first set of information comprising payment card transaction information attributable to one or more foreign payment card holders; retrieving from one or more databases a second set of information comprising domestic merchant information of one or more domestic merchants; and retrieving from one or more databases a third set of information comprising domestic educational institution information of one or more domestic educational institutions. The method also includes analyzing the first set of information and the second set of information to identify purchasing and payment activities of the one or more foreign payment card holders by date at the one or more domestic merchants; and identifying shopping patterns of the one or more foreign payment card holders at the one or more domestic merchants based on the purchasing and payment activities of the one or more foreign payment card holders by date at the one or more domestic merchants. The method further includes determining residential geolocation of the one or more foreign payment card holders based on the shopping patterns of the one or more foreign payment card holders at the one or more domestic merchants; analyzing the third set of information to identify geolocation of the one or more domestic educational institutions; and comparing residential geolocation of the one or more foreign payment card holders with geolocation of the one or more domestic educational institutions to determine a relative degree of proximity of the one or more foreign payment card holders with the one or more domestic educational institutions. The method yet further includes generating one or more predictive behavioral profiles based on the purchasing and payment activities of the one or more foreign payment card holders by date at the one or more domestic merchants with the shopping patterns of the one or more foreign payment card holders at the one or more domestic merchants, and the relative degree of proximity of the residential geolocation of the one or more foreign payment card holders with the geolocation of the one or more domestic educational institutions.

BRIEF DESCRIPTION OF THE DRAWINGS

FIG. 4 shows illustrative merchants in selected industry categories in accordance with exemplary embodiments of the present disclosure.

FIG. 7 illustrates an exemplary data set from which confidence levels (i.e., that foreign payment card holders are students) are generated in accordance with exemplary embodiments of this disclosure.

FIG. 8 illustrates an exemplary data set of purchasing and payment activities of foreign payment card holders and categories of domestic merchants in accordance with exemplary embodiments of this disclosure.

A component or a feature that is common to more than one drawing is indicated with the same reference number in each drawing.

DESCRIPTION OF THE PREFERRED EMBODIMENTS

Figure 1:
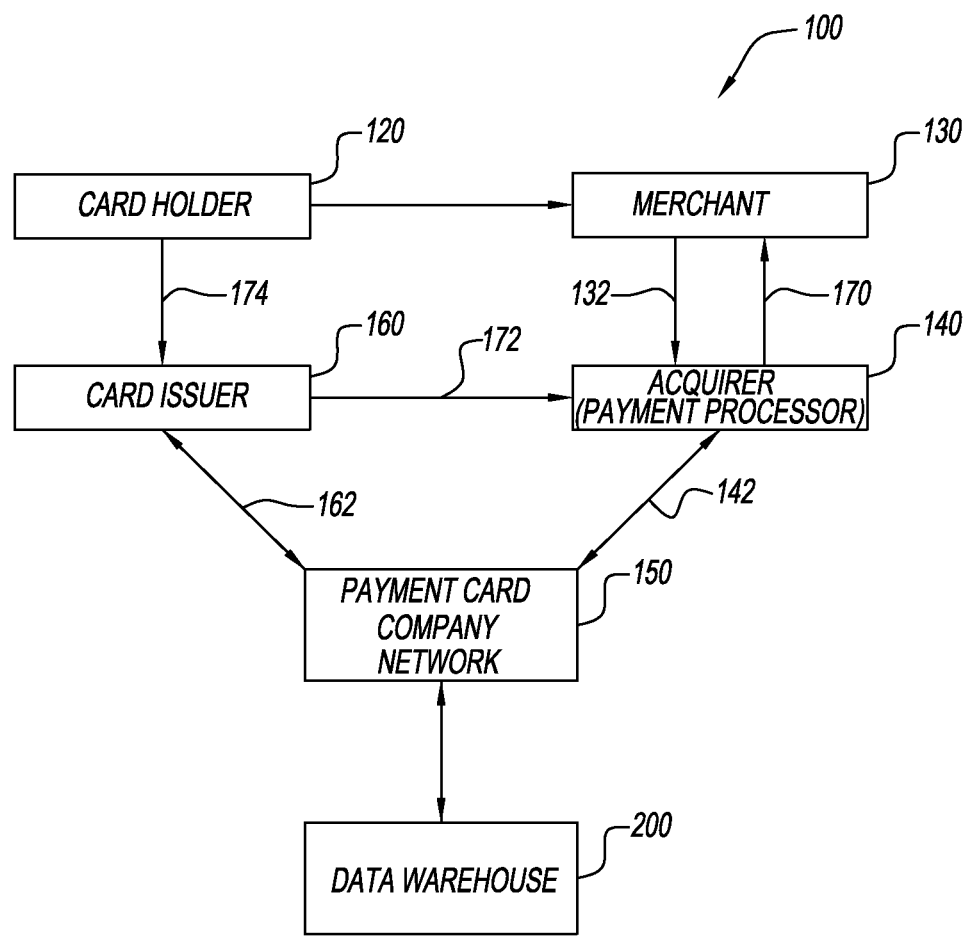
FIG. 1 is a diagram of a four party payment card system.

Embodiments of the present disclosure are described more fully hereinafter with reference to the accompanying drawings, in which some, but not all, embodiments of the present disclosure are shown. Indeed, the present disclosure can be embodied in many different forms and should not be construed as limited to the embodiments set forth herein. Rather, these embodiments are provided so that this disclosure clearly satisfies applicable legal requirements. Like numbers refer to like elements throughout.

As used herein, "foreign payment card holders" refers to payment card holders having a country of origin different from the country in which a payment card transaction is conducted. For example, a Canadian payment card holder that conducts a payment card transaction at a particular destination site in the United States is a foreign payment card holder.

As used herein, "domestic merchant" refers to a merchant located in the United States, and which conducts payment card transactions in the United States. The country of origin of the foreign payment card holder is a country different than the United States. For example, a merchant located in the United States and which conducts payment card transactions in the United States with a Canadian payment card holder, is a domestic merchant, and the Canadian payment card holder is a foreign payment cord holder.

As used herein, "domestic educational institutions" refers to places in the United States where people of different ages gain an education including, but not limited to, universities and colleges. Illustrative domestic educational institutions include, for example, public universities, private universities, vocational universities, community colleges, junior colleges, technical colleges, secondary schools, high schools, academies, and the like.

As used herein, entities can include one or more persons, organizations, businesses, institutions and/or other entities, such as financial institutions, services providers, and the like that implement one or more portions of one or more of the embodiments described and/or contemplated herein. In particular, entities can include a person, business, school, club, fraternity or sorority, an organization having members in a particular trade or profession, sales representative for a particular product, charity, not-for-profit organization, labor union, local government, government agency, or political party. It should be understood that the methods and systems of this disclosure can be practiced by a single entity or by multiple entities. Although different entities can carry out different steps or portions of the methods and systems of this disclosure, all of the steps and portions included in the methods and systems of this disclosure can be carried out by a single entity.

As used herein, the one or more databases configured to store the first set of information or from which the first set of information is retrieved, and the one or more databases configured to store the second set of information or from which the second set of information is retrieved, and the one or more databases configured to store the third set of information or from which the third set of information is retrieved, and the one or more databases configured to store the fourth set of information or from which the fourth set of information is retrieved, can be the same or different databases.

The steps and/or actions of a method described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some embodiments, the processor and the storage medium can reside in an Application Specific Integrated Circuit (ASIC). In the alternative, the processor and the storage medium can reside as discrete components in a computing device. Additionally, in some embodiments, the events and/or actions of a method can reside as one or any combination or set of codes and/or instructions on a machine-readable medium and/or computer-readable medium, which can be incorporated into a computer program product.

In one or more embodiments, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage device, or any other medium that can be used to carry or store desired program code in the form of instructions or data structures, and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc" as used herein, include compact disc (CD), laser disc, optical disc, digital versatile disc (DVD), floppy disk and blu-ray disc where disks usually reproduce data magnetically, while discs usually reproduce data optically with lasers. Combinations of the above are included within the scope of computer-readable media.

Computer program code for carrying out operations of embodiments of the present disclosure can be written in an object oriented, scripted or unscripted programming language such as Java, Perl, Smalltalk, C++, or the like. However, the computer program code for carrying out operations of embodiments of the present disclosure can also be written in conventional procedural programming languages, such as the "C" programming language or similar programming languages.

Embodiments of the present disclosure are described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer readable memory produce an article of manufacture including instruction means that implement the function/act specified in the flowchart and/or block diagram block(s).

The computer program instructions can also be loaded onto a computer or other programmable data processing apparatus to cause a series of operational steps to be performed on the computer or other programmable apparatus to produce a computer-implemented process so that the instructions that execute on the computer or other programmable apparatus provide steps for implementing the functions/acts specified in the flowchart and/or block diagram block(s). Alternatively, computer program implemented steps or acts can be combined with operator or human implemented steps or acts in order to carry out an embodiment of the present disclosure.

Thus, systems, methods and computer programs are herein disclosed to retrieve from one or more databases a first set of information comprising payment card transaction information attributable to one or more foreign payment card holders; retrieve from one or more databases a second set of information comprising domestic merchant information of one or more domestic merchants; and retrieve from one or more databases a third set of information comprising domestic educational institution information of one or more domestic educational institutions. The method analyzes the first set of information and the second set of information to identify purchasing and payment activities of the one or more foreign payment card holders by date at the one or more domestic merchants; identifies shopping patterns of the one or more foreign payment card holders at the one or more domestic merchants based on the purchasing and payment activities of the one or more foreign payment card holders by date at the one or more domestic merchants; and determines residential geolocation of the one or more foreign payment card holders based on the shopping patterns of the one or more foreign payment card holders at the one or more domestic merchants. The method also analyzes the third set of information to identify geolocation of the one or more domestic educational institutions; compares residential geolocation of the one or more foreign payment card holders with geolocation of the one or more domestic educational institutions to determine a relative degree of proximity of the one or more foreign payment card holders with the one or more domestic educational institutions; and assesses the determined relative degree of proximity to facilitate determining whether the one or more foreign payment card holders are affiliated with the one or more domestic educational institutions.

The method further analyzes the first set of information and the second set of information to identify one or more categories of domestic merchants based on domestic merchant line of business with the one or more categories of domestic merchants associated with the purchasing and payment activities of the one or more foreign payment card holders; and assesses purchasing and payment behavior of the one or more foreign payment card holders at one or more domestic merchants based on the purchasing and payment activities of the one or more foreign payment card holders and the one or more categories of domestic merchants.

Among many potential uses, the systems and methods described herein can be used to: (1) identify foreign payment card holders (e.g., students) affiliated with a domestic educational institution; (2) target marketing to the foreign payment card holders (e.g., students); (3) nurture a potential retention of the foreign payment card holders (e.g., students) as future customers; (4) develop insights and actions to enhance domestic merchants in staffing/customer service, as well as inventory/stocking in their stores to reflect the dominant foreign payment card holders (e.g., students) in a geolocation; (5) merchants can effectively advertise to promote their brand to foreign payment card holders (e.g., students) where opportunities exist; (6) identify residential geolocation of foreign payment card holders (e.g., students); and (7) determine affluence level of foreign payment card holders (e.g., students).

Further, the systems and methods described herein can be used to: (1) allow a domestic merchant, for example, to gear advertising towards certain foreign payment card holders (e.g., students) to increase foreign shopper flow and transactions; (2) allow a domestic merchant to enhance the foreign payment card holder (e.g., students) shopping experience with language, customs, food, brochures, and the like, for the most popular countries of origin of foreign shoppers; and (3) allow domestic merchants to better target foreign payment card holders (e.g., students) and/or enhance existing customer relationships with foreign payment card holders (e.g., students). Other uses are possible.

Referring to the drawings and, in particular, FIG. 1, there is shown a four party payment (credit, debit or other) card system generally represented by reference numeral 100. In card system 100, card holder 120 submits the payment card to the merchant 130. The merchant's point of sale (POS) device communicates 132 with his acquiring bank or acquirer 140, which acts as a payment processor. The acquirer 140 initiates, at 142, the transaction on the payment card company network 150. The payment card company network 150 (that includes a financial transaction processing company) routes, via 162, the transaction to the issuing bank or card issuer 160, which is identified using information in the transaction message. The card issuer 160 approves or denies an authorization request, and then routes, via the payment card company network 150, an authorization response back to the acquirer 140. The acquirer 140 sends approval to the POS device of the merchant 130. Thereafter, seconds later, if the transaction is approved, the card holder completes the purchase and receives a receipt.

The account of the merchant 130 is credited, via 170, by the acquirer 140. The card issuer 160 pays, via 172, the acquirer 140. Eventually, the card holder 120 pays, via 174, the card issuer 160.

Data warehouse 200 is a database used by payment card company network 150 for reporting and data analysis. According to one embodiment, data warehouse 200 is a central repository of data that is created by storing certain transaction data from transactions occurring within four party payment card system 100. According to another embodiment, data warehouse 200 stores, for example, the date, time, amount, location, merchant code, and merchant category for every transaction occurring within payment card network 150.

In yet another embodiment, data warehouse 200 stores, reviews, and/or analyzes information used in: (i) analyzing the first set of information and the second set of information to identify purchasing and payment activities of the one or more foreign payment card holders by date at the one or more domestic merchants; (ii) identifying shopping patterns of the one or more foreign payment card holders at the one or more domestic merchants based on the purchasing and payment activities of the one or more foreign payment card holders by date at the one or more domestic merchants; (iii) determining residential geolocation of the one or more foreign payment card holders based on the shopping patterns of the one or more foreign payment card holders at the one or more domestic merchants; (iv) analyzing the third set of information to identify geolocation of the one or more domestic educational institutions; (v) comparing residential geolocation of the one or more foreign payment card holders with geolocation of the one or more domestic educational institutions to determine a relative degree of proximity of the one or more foreign payment card holders with the one or more domestic educational institutions; and (vi) assessing the determined relative degree of proximity to facilitate determining whether the one or more foreign payment card holders are affiliated with the one or more domestic educational institutions.

The residential geolocation of the one or more foreign payment card holders and the geolocation of the one or more domestic educational institutions can include, for example, geographic areas (e.g., ZIP codes, metropolitan areas (metropolitan statistical area (MSA), designated market area (DMA), and the like), street addresses, and the like.

In another embodiment, data warehouse 200 stores, reviews, and/or analyzes information used in: (i) analyzing the first set of information and the second set of information to identify one or more categories of domestic merchants based on domestic merchant line of business with the one or more categories of domestic merchants associated with the purchasing and payment activities of the one or more foreign payment card holders; and (ii) assessing purchasing and payment behavior of the one or more foreign payment card holders at one or more domestic merchants based on the purchasing and payment activities of the one or more foreign payment card holders and the one or more categories of domestic merchants.

In still another embodiment, data warehouse 200 stores, reviews, and/or analyzes information used in: (i) generating a geolocation score that is indicative of the relative degree of proximity of the residential geolocation of the one or more foreign payment card holders with the geolocation of the one or more domestic educational institutions; (ii) generating an affluence score that is indicative of the purchasing and payment behavior of the one or more foreign payment card holders at one or more domestic merchants based on the purchasing and payment activities of the one or more foreign payment card holders and the one or more categories of domestic merchants; and (iii) targeting information including at least one or more suggestions or recommendations for foreign payment card holder spending or purchasing activity at one or more domestic merchants, based on the shopping patterns of the one or more foreign payment card holders at the one or more domestic merchants.

In yet another embodiment, data warehouse 200 stores, reviews, and/or analyzes information used in generating one or more predictive behavioral profiles based on the purchasing and payment activities of the one or more foreign payment card holders by date at the one or more domestic merchants with the shopping patterns of the one or more foreign payment card holders at the one or more domestic merchants, and the relative degree of proximity of the residential geolocation of the one or more foreign payment card holders with the geolocation of the one or more domestic educational institutions. The one or more foreign payment card holders have a propensity to carry out certain activities based on the one or more predictive behavioral profiles.

In yet still another embodiment, data warehouse 200 stores, reviews, and/or analyzes information used in creating one or more datasets to store information relating to: (i) purchasing and payment activities of the one or more foreign payment card holders by date at the one or more domestic merchants; (ii) shopping patterns of the one or more foreign payment card holders at the one or more domestic merchants; (iii) residential geolocation of the one or more foreign payment card holders; (iv) geolocation of the one or more domestic educational institutions; (v) relative degree of proximity of the one or more foreign payment card holders with the one or more domestic educational institutions; and (vi) affiliation of one or more foreign payment card holders with the one or more domestic educational institutions.

In still another embodiment, data warehouse 200 stores, reviews, and/or analyzes information used in creating one or more datasets to store information relating to: (i) one or more categories of domestic merchants based on domestic merchant line of business with the one or more categories of domestic merchants associated with the purchasing and payment activities of the one or more foreign payment card holders; and (ii) purchasing and payment behavior of the one or more foreign payment card holders at one or more domestic merchants.

In still another embodiment, data warehouse 200 stores, reviews, and/or analyzes information used in creating one or more datasets to store information relating to: (i) a geolocation score that is indicative of the relative degree of proximity of the residential geolocation of the one or more foreign payment card holders with the geolocation of the one or more domestic educational institutions; (ii) an affluence score that is indicative of the purchasing and payment behavior of the one or more foreign payment card holders at one or more domestic merchants based on the purchasing and payment activities of the one or more foreign payment card holders and the one or more categories of domestic merchants; and (iii) targeting including at least one or more suggestions or recommendations for foreign payment card holder spending or purchasing activity at one or more domestic merchants, based on the shopping patterns of the one or more foreign payment card holders at the one or more domestic merchants.

In yet still another embodiment, data warehouse 200 stores, reviews, and/or analyzes information used in creating one or more datasets to store information relating to one or more predictive behavioral profiles based on the purchasing and payment activities of the one or more foreign payment card holders by date at the one or more domestic merchants with the shopping patterns of the one or more foreign payment card holders at the one or more domestic merchants, and the relative degree of proximity of the residential geolocation of the one or more foreign payment card holders with the geolocation of the one or more domestic educational institutions.

In another embodiment, data warehouse 200 stores, reviews, and/or analyzes information used in developing logic for: (i) analyzing the first set of information and the second set of information to identify purchasing and payment activities of the one or more foreign payment card holders by date at the one or more domestic merchants; (ii) identifying shopping patterns of the one or more foreign payment card holders at the one or more domestic merchants based on the purchasing and payment activities of the one or more foreign payment card holders by date at the one or more domestic merchants; (iii) determining residential geolocation of the one or more foreign payment card holders based on the shopping patterns of the one or more foreign payment card holders at the one or more domestic merchants; (iv) analyzing the third set of information to identify geolocation of the one or more domestic educational institutions; (v) comparing residential geolocation of the one or more foreign payment card holders with geolocation of the one or more domestic educational institutions to determine a relative degree of proximity of the one or more foreign payment card holders with the one or more domestic educational institutions; and (vi) assessing the determined relative degree of proximity to facilitate determining whether the one or more foreign payment card holders are affiliated with the one or more domestic educational institutions.

In still another embodiment, data warehouse 200 stores, reviews, and/or analyzes information used in developing logic for: (i) analyzing the first set of information and the second set of information to identify one or more categories of domestic merchants based on domestic merchant line of business with the one or more categories of domestic merchants associated with the purchasing and payment activities of the one or more foreign payment card holders; and (ii) assessing purchasing and payment behavior of the one or more foreign payment card holders at one or more domestic merchants based on the purchasing and payment activities of the one or more foreign payment card holders and the one or more categories of domestic merchants.

In yet another embodiment, data warehouse 200 stores, reviews, and/or analyzes information used in developing logic for: (i) generating a geolocation score that is indicative of the relative degree of proximity of the residential geolocation of the one or more foreign payment card holders with the geolocation of the one or more domestic educational institutions; (ii) generating an affluence score that is indicative of the purchasing and payment behavior of the one or more foreign payment card holders at one or more domestic merchants based on the purchasing and payment activities of the one or more foreign payment card holders and the one or more categories of domestic merchants; and (iii) targeting information including at least one or more suggestions or recommendations for foreign payment card holder spending or purchasing activity at one or more domestic merchants, based on the shopping patterns of the one or more foreign payment card holders at the one or more domestic merchants.

In another embodiment, data warehouse 200 stores, reviews, and/or analyzes information used in developing logic for generating one or more predictive behavioral profiles based on the purchasing and payment activities of the one or more foreign payment card holders by date at the one or more domestic merchants with the shopping patterns of the one or more foreign payment card holders at the one or more domestic merchants, and the relative degree of proximity of the residential geolocation of the one or more foreign payment card holders with the geolocation of the one or more domestic educational institutions. The one or more foreign payment card holders have a propensity to carry out certain activities based on the one or more predictive behavioral profiles.

In still another embodiment, data warehouse 200 stores, reviews, and/or analyzes information used in targeting information including at least one or more suggestions or recommendations for an entity (e.g., domestic merchant), based on the shopping patterns of the one or more foreign payment card holders at the one or more domestic merchants.

In another embodiment, data warehouse 200 aggregates the information by foreign payment card holder, domestic merchant, domestic educational institution, category and/or location. In still another embodiment, data warehouse 200 integrates data from one or more disparate sources. Data warehouse 200 stores current as well as historical data and is used for creating reports, performing analyses on the network, merchant analyses, and performing predictive analyses.

Figure 2:
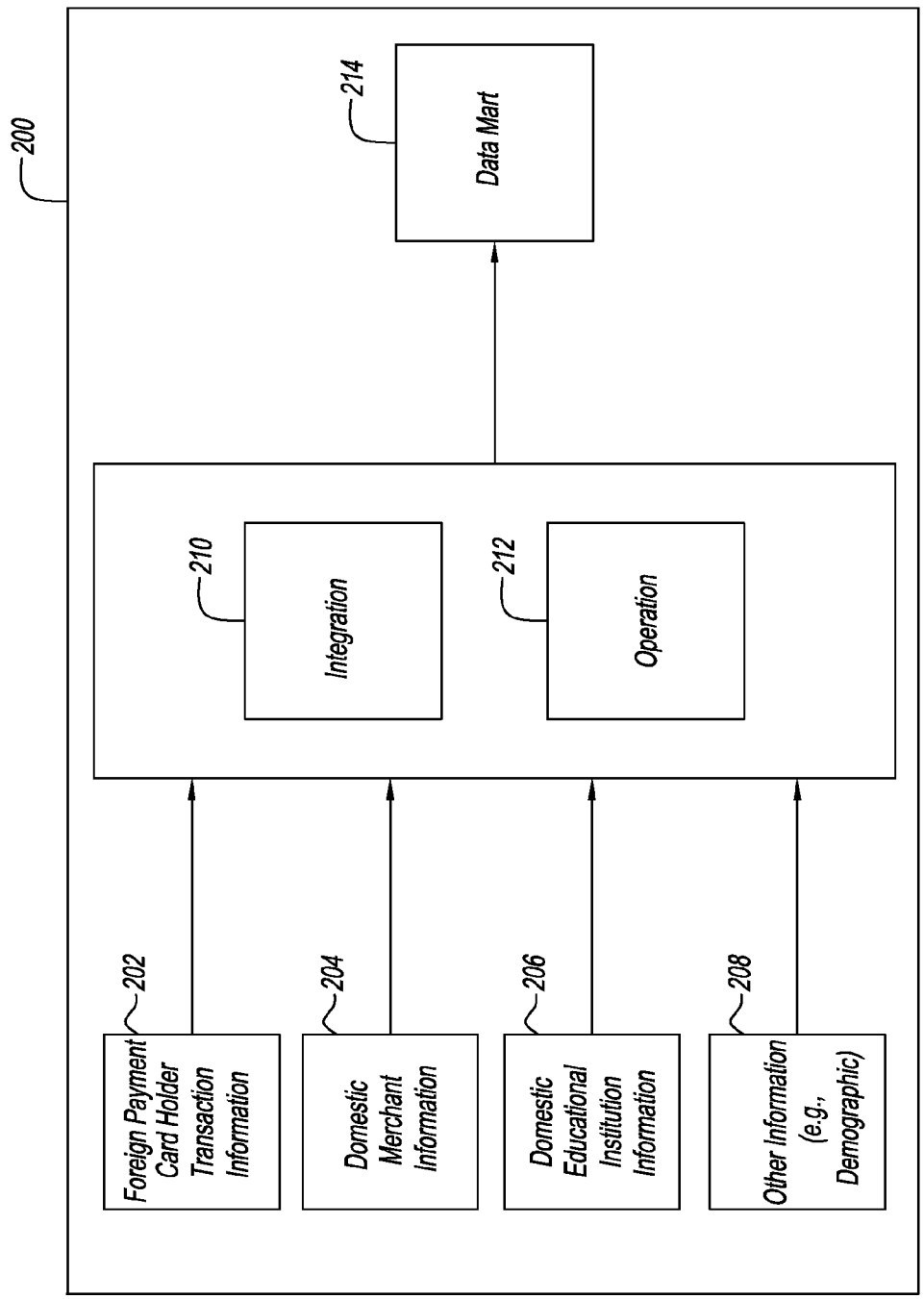
FIG. 2 illustrates a data warehouse shown in FIG. 1 that is a central repository of data that is created by storing certain transaction data from transactions occurring in four party payment card system of FIG. 1.

Referring to FIG. 2, an exemplary data warehouse 200 (the same data warehouse 200 in FIG. 1) for reporting and data analysis, including the storing, reviewing, and/or analyzing of information, for the various purposes described above is shown. The data warehouse 200 can have a plurality of entries (e.g., entries 202, 204, 206 and 208).

The foreign payment card holder transaction information 202 can include, for example, foreign payment card transaction information, foreign payment card holder information, and purchasing and payment activities attributable to foreign payment card holders, that can be aggregated by foreign payment card holder, country of origin of foreign payment card holder, category and/or location in the data warehouse 200. The foreign payment card holder transaction information 202 can also include, for example, transaction dates, foreign payment card numbers, country of issuance of the payment card, transaction amounts, a transaction identifier, geolocation of payment card transaction, geolocation date on which payment card transaction occurred, geolocation time on which payment card transaction occurred, and the like.

The domestic merchant information 204 can include, for example, categories of domestic merchants, merchant name, and the like. The domestic merchant information 204 can also include, for example, a domestic merchant identifier, geolocation of domestic merchant, and the like.

The domestic educational institution information 206 includes, for example, geolocation of educational institution, name of educational institution, curriculums at the educational institution, demographics of students attending the educational institution, and the like.

The other information 208 includes, for example, demographic data. The other information 208 can include other suitable information that can be useful in assessing the determined relative degree of proximity to facilitate determining whether the one or more foreign payment card holders are affiliated with the one or more domestic educational institutions, assessing purchasing and payment behavior of the one or more foreign payment card holders at one or more domestic merchants based on the purchasing and payment activities of the one or more foreign payment card holders and the one or more categories of domestic merchants; generating a geolocation score that is indicative of the relative degree of proximity of the residential geolocation of the one or more foreign payment card holders with the geolocation of the one or more domestic educational institutions; and generating an affluence score that is indicative of the purchasing and payment behavior of the one or more foreign payment card holders at one or more domestic merchants based on the purchasing and payment activities of the one or more foreign payment card holders and the one or more categories of domestic merchants.

The other information 208 can include other suitable information that can be useful in targeting information including at least one or more suggestions or recommendations for foreign payment card holder spending or purchasing activity at one or more domestic merchants, based on the shopping patterns of the one or more foreign payment card holders at the one or more domestic merchants; and generating one or more predictive behavioral profiles based on the purchasing and payment activities of the one or more foreign payment card holders by date at the one or more domestic merchants with the shopping patterns of the one or more foreign payment card holders at the one or more domestic merchants, and the relative degree of proximity of the residential geolocation of the one or more foreign payment card holders with the geolocation of the one or more domestic educational institutions.

The typical data warehouse uses staging, data integration, and access layers to house its key functions. The staging layer or staging database stores raw data extracted from each of the disparate source data systems. The integration layer integrates at 210 the disparate data sets by transforming the data from the staging layer often storing this transformed data in an operational data store database 212. For example, the foreign payment card holder transaction information 202 can be aggregated by merchant, category and/or location at 210. Also, the reporting and data analysis, including the storing, reviewing, and/or analyzing of information, for the various purposes described above, can occur in data warehouse 200. The integrated data is then moved to yet another database, often called the data warehouse database or data mart 214, where the data is arranged into hierarchical groups often called dimensions and into facts and aggregate facts. The access layer helps users retrieve data.

A data warehouse constructed from an integrated data source systems does not require staging databases or operational data store databases. The integrated data source systems can be considered to be a part of a distributed operational data store layer. Data federation methods or data virtualization methods can be used to access the distributed integrated source data systems to consolidate and aggregate data directly into the data warehouse database tables. The integrated source data systems and the data warehouse are all integrated since there is no transformation of dimensional or reference data. This integrated data warehouse architecture supports the drill down from the aggregate data of the data warehouse to the transactional data of the integrated source data systems.

The data mart 214 is a small data warehouse focused on a specific area of interest. For example, the data mart 214 can be focused on one or more of reporting and data analysis, including the storing, reviewing, and/or analyzing of information, for any of the various purposes described above. Data warehouses can be subdivided into data marts for improved performance and ease of use within that area. Alternatively, an organization can create one or more data marts as first steps towards a larger and more complex enterprise data warehouse.

This definition of the data warehouse focuses on data storage. The main source of the data is cleaned, transformed, cataloged and made available for use by managers and other business professionals for data mining, online analytical processing, market research and decision support. However, the means to retrieve and analyze data, to extract, transform and load data, and to manage the data dictionary are also considered essential components of a data warehousing system. Many references to data warehousing use this broader context. Thus, an expanded definition for data warehousing includes business intelligence tools, tools to extract, transform and load data into the repository, and tools to manage and retrieve metadata.

Algorithms can be employed to determine formulaic descriptions of the integration of the data source information and/or generation of one or more analyses or updates using any of a variety of known mathematical techniques. These formulas, in turn, can be used to derive or generate one or more analyses and updates for analyzing, creating, comparing and identifying activities using any of a variety of available trend analysis algorithms. For example, these formulas can be used in the reporting and data analysis, including the storing, reviewing, and/or analyzing of information, for the various purposes described above.

Figure 3:
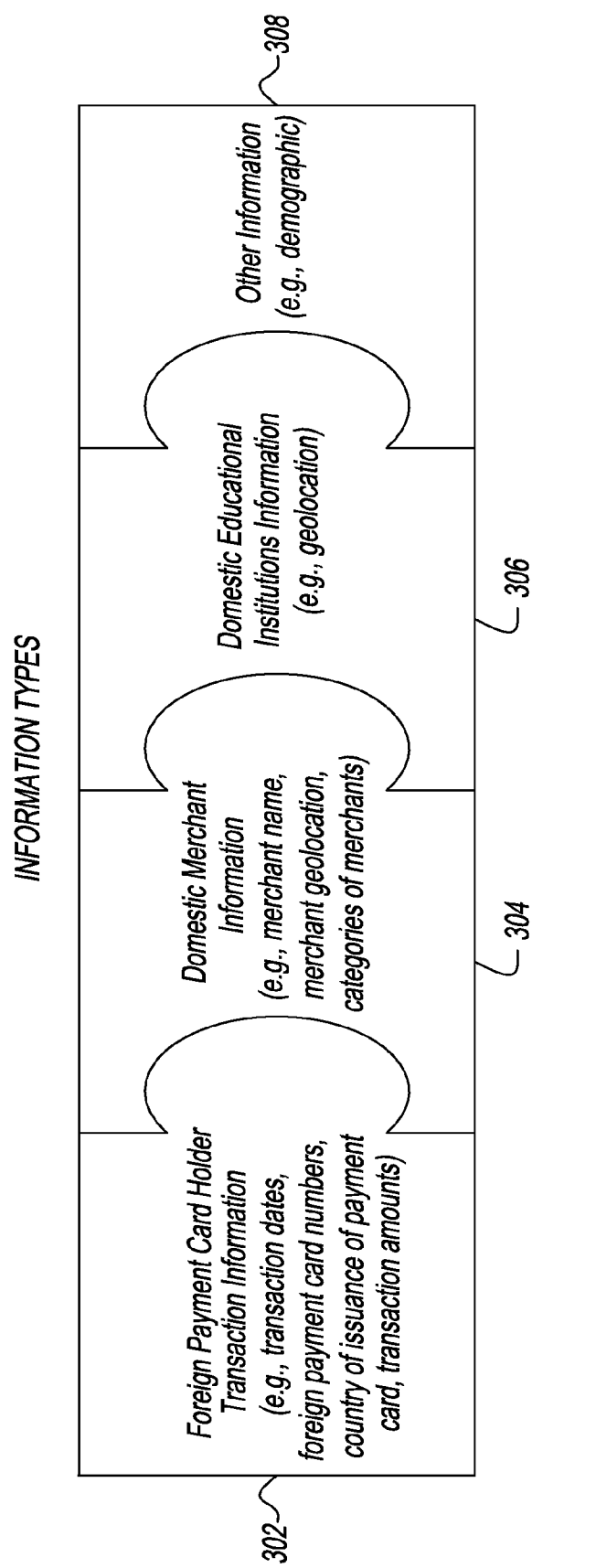
FIG. 3 shows illustrative information types used in the systems and the methods of the present disclosure.

In accordance with the method of this disclosure, information that is stored in one or more databases can be retrieved (e.g., by a processor). FIG. 3 shows illustrative information types used in the systems and methods of this disclosure.

The information can include, for example, a first set of information 302 that can be retrieved from one or more databases owned or controlled by an entity, for example, a payment card company (part of the payment card company network 150 in FIG. 1). The foreign payment card holder transaction information 302 can include, for example, foreign payment card transaction information, foreign payment card holder information (e.g., payment card holder account identifier (likely anonymized), payment card holder geography (potentially modeled), payment card holder type (consumer/business), payment card holder demographics, and the like), and purchasing and payment activities attributable to foreign payment card holders, that can be aggregated by foreign payment card holder, country of origin of foreign payment card holder, category and/or location, transaction date and time, and transaction amount. The foreign payment card holder transaction information 302 can also include, for example, transaction dates, foreign payment card numbers, country of issuance of the payment card, transaction amounts, a transaction identifier, geolocation of payment card transaction, geolocation date on which payment card transaction occurred, geolocation time on which payment card transaction occurred, and the like. Information for inclusion in the first set of information can be obtained, for example, from payment card companies known as Master-Card®, Visa®, American Express®, and the like (part of the payment card company network 150 in FIG. 1).

The domestic merchant information 304 can include, for example, categories of domestic merchants, domestic merchant name, domestic merchant geography, domestic merchant line of business, and the like. The domestic merchant information 304 can also include, for example, a domestic merchant identifier, geolocation of domestic merchant, and the like.

One or more databases are used for storing information of one or more domestic merchants, and domestic merchants belonging to a particular category, e.g., industry category. Illustrative domestic merchant categories are described herein. The domestic merchant categorization is useful for generating one or more predictive behavioral profiles.

In an embodiment, a domestic merchant category can include a segment of a particular industry. In some embodiments, the domestic merchant category can be defined using domestic merchant category codes according to predefined industries, which can be aligned using standard industrial classification codes, or using the industry categorization described herein.

Domestic merchant categorization indicates the category or categories assigned to each domestic merchant name. As described herein, domestic merchant category information is used for purposes of generating one or more predictive behavioral profiles, although other uses are possible. According to one embodiment, each domestic merchant name is associated with only one domestic merchant category. In alternate embodiments, however, domestic merchants are associated with a plurality of categories as apply to their particular businesses. Generally, domestic merchants are categorized according to conventional industry codes as defined by a selected external source (e.g., a merchant category code (MCC), Hoovers™, the North American Industry Classification System (NAICS), and the like). However, in one embodiment, domestic merchant categories are assigned based on system operator preferences, or some other similar categorization process.

An illustrative domestic merchant categorization including industry codes is set forth below.

| INDUSTRY | INDUSTRY NAME |
|---|---|
| AAC | Children's Apparel |
| AAF | Family Apparel |
| AAM | Men's Apparel |
| AAW | Women's Apparel |
| AAX | Miscellaneous Apparel |
| ACC | Accommodations |
| ACS | Automotive New and Used Car Sales |
| ADV | Advertising Services |
| AFH | Agriculture/Forestry/Fishing/Hunting |
| AFS | Automotive Fuel |
| ALS | Accounting and Legal Services |
| ARA | Amusement, Recreation Activities |
| ART | Arts and Crafts Stores |
| AUC | Automotive Used Only Car Sales |
| AUT | Automotive Retail |
| BKS | Book Stores |
| BMV | Music and Videos |
| BNM | Newspapers and Magazines |
| BTN | Bars/Taverns/Nightclubs |
| BWL | Beer/Wine/Liquor Stores |
| CCR | Consumer Credit Reporting |
| CEA | Consumer Electronics/Appliances |
| CES | Cleaning and Exterminating Services |
| CGA | Casino and Gambling Activities |
| CMP | Computer/Software Stores |
| CNS | Construction Services |
| COS | Cosmetics and Beauty Services |
| CPS | Camera/Photography Supplies |
| CSV | Courier Services |
| CTE | Communications, Telecommunications Equipment |
| CTS | Communications, Telecommunications, Cable Services |
| CUE | College, University Education |
| CUF | Clothing, Uniform, Costume Rental |
| DAS | Dating Services |
| DCS | Death Care Services |
| DIS | Discount Department Stores |
| DLS | Drycleaning, Laundry Services |
| DPT | Department Stores |
| DSC | Drug Store Chains |
| DVG | Variety/General Merchandise Stores |
| EAP | Eating Places |
| ECA | Employment, Consulting Agencies |
| EHS | Elementary, Middle, High Schools |
| EQR | Equipment Rental |
| ETC | Miscellaneous |
| FLO | Florists |
| FSV | Financial Services |
| GHC | Giftware/Houseware/Card Shops |
| GRO | Grocery Stores |
| GSF | Specialty Food Stores |

-continued

| INDUSTRY | INDUSTRY NAME |
|---|---|
| HBM | Health/Beauty/Medical Supplies |
| HCS | Health Care and Social Assistance |
| HFF | Home Furnishings/Furniture |
| HIC | Home Improvement Centers |
| INS | Insurance |
| IRS | Information Retrieval Services |
| JGS | Jewelry and Giftware |
| LEE | Live Performances, Events, Exhibits |
| LLS | Luggage and Leather Stores |
| LMS | Landscaping/Maintenance Services |
| MAS | Miscellaneous Administrative and Waste Disposal Services |
| MER | Miscellaneous Entertainment and Recreation |
| MES | Miscellaneous Educational Services |
| MFG | Manufacturing |
| MOS | Miscellaneous Personal Services |
| MOT | Movie and Other Theatrical |
| MPI | Miscellaneous Publishing Industries |
| MPS | Miscellaneous Professional Services |
| MRS | Maintenance and Repair Services |
| MTS | Miscellaneous Technical Services |
| MVS | Miscellaneous Vehicle Sales |
| OPT | Optical |
| OSC | Office Supply Chains |
| PCS | Pet Care Services |
| PET | Pet Stores |
| PFS | Photofinishing Services |
| PHS | Photography Services |
| PST | Professional Sports Teams |
| PUA | Public Administration |
| RCP | Religious, Civic and Professional Organizations |
| RES | Real Estate Services |
| SGS | Sporting Goods/Apparel/Footwear |
| SHS | Shoe Stores |
| SND | Software Production, Network Services and Data Processing |
| SSS | Security, Surveillance Services |
| TAT | Travel Agencies and Tour Operators |
| TEA | T + E Airlines |
| TEB | T + E Bus |
| TET | T + E Cruise Lines |
| TEV | T + E Vehicle Rental |
| TOY | Toy Stores |
| TRR | T + E Railroad |
| TSE | Training Centers, Seminars |
| TSS | Other Transportation Services |
| TTL | T + E Taxi and Limousine |
| UTL | Utilities |
| VES | Veterinary Services |
| VGR | Video and Game Rentals |
| VTB | Vocation, Trade and Business Schools |
| WAH | Warehouse |
| WHC | Wholesale Clubs |
| WHT | Wholesale Trade |

Illustrative domestic merchants and industry categorization are shown in FIG. 4. The illustrative industry categories include AFS Automotive Fuel, GRO Grocery Stores, EAP Eating Places, and ACC Accommodations. Illustrative domestic merchants associated with the industry categories are listed in FIG. 4. In accordance with this disclosure, domestic merchant categorization is important for assessing purchasing and payment activities of foreign payment card holders. Proper domestic merchant categorization is important to obtain results that are truly reflective of the particular domestic merchant and industry, in particular, to determine how purchasing and payment activities of foreign payment card holders is trending for one domestic merchant in comparison to another domestic merchant in the same industry category.

Also, the information can include a third set of information including domestic educational institution information 306. The domestic educational institution information 306 includes, for example, geolocation of educational institution, name of educational institution, curriculums at the educational institution, demographics of students attending the educational institution, and the like.

Also, the information can include, for example, a fourth set of information including other information 308. Illustrative fourth set information can include, for example, demographic data, and the like. The fourth set of information affords leveraged data sources that can supplement information in the first set of information, the second set of information, and the third set of information.

Demographic information can also be used to supplement or leverage the first set of information and the second set of information. Illustrative demographic information includes, for example, gender, age, income, education, and the like.

With regard to the sets of information, filters can be employed to select particular portions of the information. For example, time range filters can be used that can vary based on need or availability.

In an embodiment, all information stored in each of the one or more databases can be retrieved. In another embodiment, only a single entry in each database can be retrieved. The retrieval of information can be performed a single time, or can be performed multiple times. In an exemplary embodiment, only information pertaining to a specific entry is retrieved from each of the databases.

Figure 5:
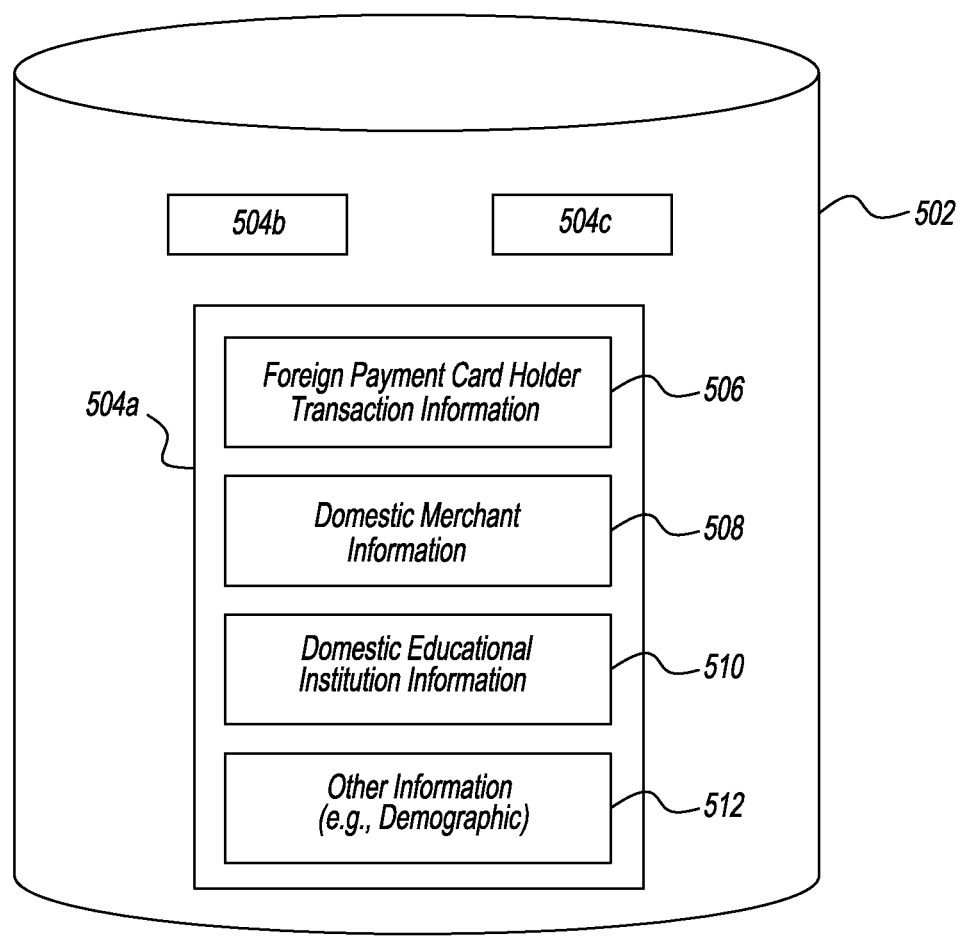
FIG. 5 illustrates an exemplary dataset for the storing, reviewing, and/or analyzing of information used in the systems and the methods of the present disclosure.

Referring to FIG. 5, an exemplary dataset 502 stores, reviews, and/or analyzes of information used in the systems and methods of this disclosure. The dataset 502 can include a plurality of entries (e.g., entries 504a, 504b, and 504c).

The foreign payment card transaction information 506 includes payment card transactions and actual spending by foreign payment card holders. More specifically, foreign payment card transaction information 506 can include, for example, foreign payment card transaction information, transaction date and time, transaction amount, foreign payment card holder information (e.g., foreign payment card holder account identifier (likely anonymized), foreign payment card holder geography (potentially modeled), foreign payment card holder type (consumer/business), foreign payment card holder demographics, and the like), and purchasing and payment activities attributable to foreign payment card holders, that can be aggregated by foreign payment card holder, country of origin of foreign payment card holder, category and/or location, transaction date and time, and transaction amount. The foreign transaction payment card information 506 can also include, for example, transaction dates, foreign payment card numbers, country of issuance of the payment card, transaction amounts, a transaction identifier, geolocation of payment card transaction, geolocation date on which payment card transaction occurred, geolocation time on which payment card transaction occurred, and the like. Information for inclusion in the first set of information can be obtained, for example, from payment card companies known as MasterCard®, Visa®, American Express®, and the like (part of the payment card company network 150 in FIG. 1).

The domestic merchant information 508 can include, for example, categories of domestic merchants, domestic merchant name, domestic merchant geography, domestic merchant line of business, and the like. The domestic merchant information 508 can also include, for example, a domestic merchant identifier, geolocation of domestic merchant, and the like.

The domestic educational institution information 510 includes, for example, geolocation of educational institution, name of educational institution, curriculums at the educational institution, demographics of students attending the educational institution, and the like.

The other information 512 includes, for example, demographic data, and other suitable information that can be useful in conducting the systems and methods of this disclosure.

Algorithms can be employed to determine formulaic descriptions of the integration of the foreign payment card transaction information 506, domestic merchant information 508, domestic educational institution information 510, and optionally the other information 512 using any of a variety of known mathematical techniques. These formulas, in turn, can be used to derive or generate one or more analyses and updates using any of a variety of available trend analysis algorithms. For example, these formulas can be used to assess the determined relative degree of proximity to facilitate determining whether the one or more foreign payment card holders are affiliated with the one or more domestic educational institutions, assess purchasing and payment behavior of the one or more foreign payment card holders at one or more domestic merchants based on the purchasing and payment activities of the one or more foreign payment card holders and the one or more categories of domestic merchants; generate a geolocation score that is indicative of the relative degree of proximity of the residential geolocation of the one or more foreign payment card holders with the geolocation of the one or more domestic educational institutions; and generate an affluence score that is indicative of the purchasing and payment behavior of the one or more foreign payment card holders at one or more domestic merchants based on the purchasing and payment activities of the one or more foreign payment card holders and the one or more categories of domestic merchants.

Also, for example, these formulas can be used to target information including at least one or more suggestions or recommendations for foreign payment card holder spending or purchasing activity at one or more domestic merchants, based on the shopping patterns of the one or more foreign payment card holders at the one or more domestic merchants; and generate one or more predictive behavioral profiles based on the shopping patterns of the one or more foreign payment card holders at the one or more domestic merchants, and the relative degree of proximity of the residential geolocation of the one or more foreign payment card holders with the geolocation of the one or more domestic educational institutions. As described herein, the shopping patterns are derived from the purchasing and payment activities of the one or more foreign payment card holders, in particular, by date at the one or more domestic merchants.

In an embodiment, logic is developed for assessing the determined relative degree of proximity to facilitate determining whether the one or more foreign payment card holders are affiliated with the one or more domestic educational institutions, assessing purchasing and payment behavior of the one or more foreign payment card holders at one or more domestic merchants based on the purchasing and payment activities of the one or more foreign payment card holders and the one or more categories of domestic merchants; generating a geolocation score that is indicative of the relative degree of proximity of the residential geolocation of the one or more foreign payment card holders with the geolocation of the one or more domestic educational institutions; and generating an affluence score that is indicative of the purchasing and payment behavior of the one or more foreign payment card holders at one or more domestic merchants based on the purchasing and payment activities of the one or more foreign payment card holders and the one or more categories of domestic merchants.

Also, logic is developed for targeting information including at least one or more suggestions or recommendations for foreign payment card holder spending or purchasing activity at one or more domestic merchants, based on the shopping patterns of the one or more foreign payment card holders at the one or more domestic merchants; and generating one or more predictive behavioral profiles based on the shopping patterns of the one or more foreign payment card holders at the one or more domestic merchants, and the relative degree of proximity of the residential geolocation of the one or more foreign payment card holders with the geolocation of the one or more domestic educational institutions. As described herein, the shopping patterns are derived from the purchasing and payment activities of the one or more foreign payment card holders, in particular, by date at the one or more domestic merchants.

The logic is applied to a universe of foreign payment card holders to identify purchasing and payment activities of the universe of foreign payment card holders at one or more domestic merchants.

In accordance with the method of this disclosure, information that is stored in one or more databases can be retrieved (e.g., by a processor). The information can include, for example, billing activities attributable to the financial transaction processing entity (e.g., a payment card company) and purchasing and payment activities, including date and time, attributable to foreign payment card holders, domestic merchant information, demographic (e.g., age and gender), geographic (e.g., zip code and state or country of residence), and the like. Other illustrative information can include, for example, demographic (e.g., age and gender), geographic (e.g., zip code and state or country of residence), and the like.

In an embodiment, all information stored in each database can be retrieved. In another embodiment, only a single entry in each of the one or more databases can be retrieved. The retrieval of information can be performed a single time, or can be performed multiple times. In an exemplary embodiment, only information pertaining to a specific predictive behavioral profile is retrieved from each of the databases.

Figure 6:
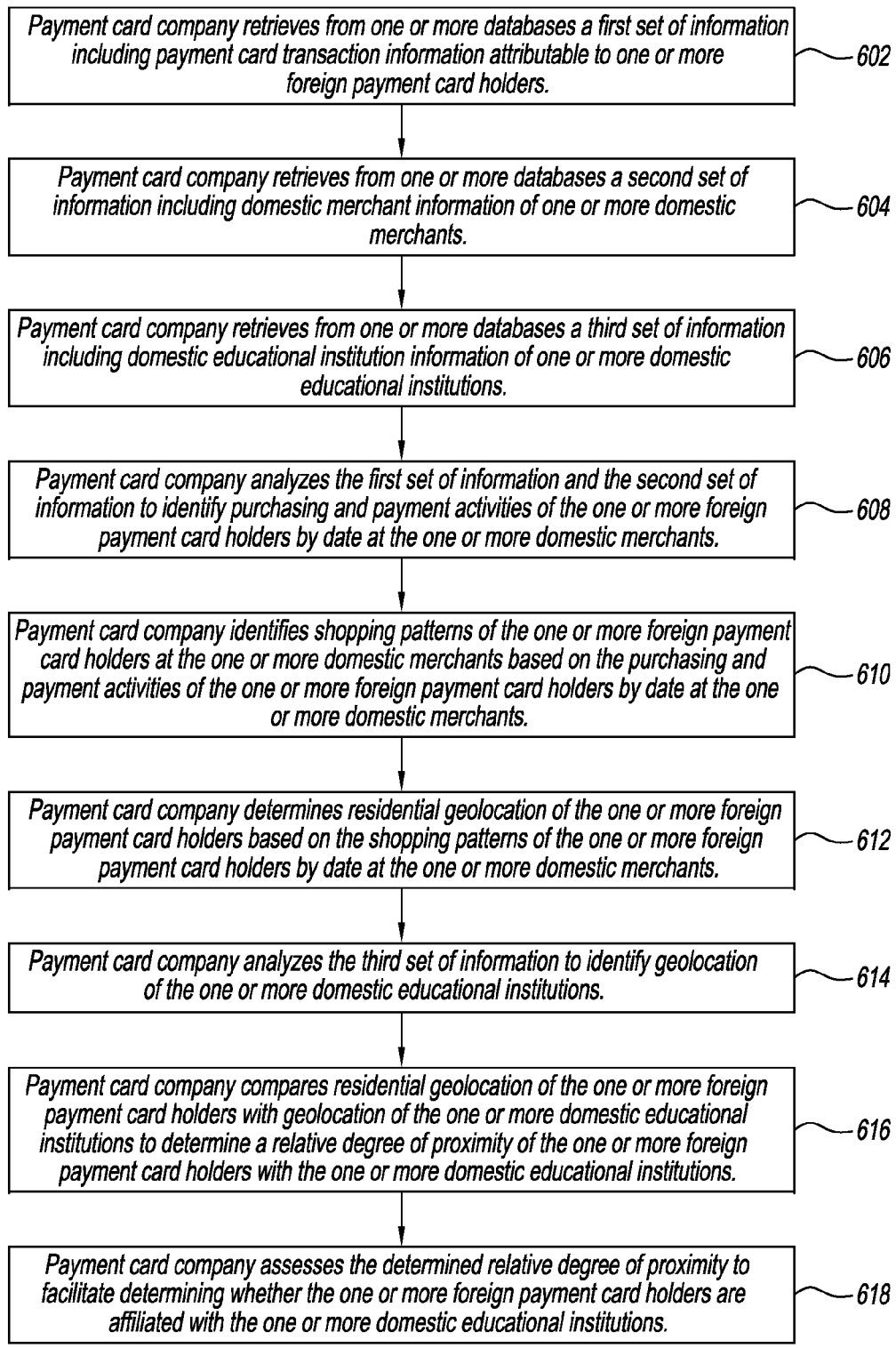
FIG. 6 is a block diagram illustrating a method for assessing the relative degree of geolocation proximity of foreign payment card holders and domestic educational institutions to facilitate determining whether the foreign payment card holders are affiliated with the domestic educational institutions in accordance with exemplary embodiments of the present disclosure.

FIG. 6 illustrates an exemplary method for an entity (e.g., payment card company) for determining whether the one or more foreign payment card holders are affiliated (e.g., students) with the one or more domestic educational institutions in accordance with the method of this disclosure. At step 602, a payment card company (part of the payment card company network 150 in FIG. 1) retrieves, from one or more databases, information including purchasing and payment information attributable to one or more foreign payment card holders. The information at 602 includes foreign payment card holder transaction information, foreign payment card holder information (e.g., payment card holder account identifier (likely anonymized), payment card holder geography (potentially modeled), payment card holder type (consumer/business), payment card holder demographics, and the like), and purchasing and payment activities attributable to foreign payment card holders. In particular, the information at 602 includes transaction dates, foreign payment card numbers, country of issuance of the payment card, transaction amounts, a transaction identifier, geolocation of payment card transaction, geolocation date on which payment card transaction occurred, geolocation time on which payment card transaction occurred, and the like.

The payment card company retrieves, from one or more databases, domestic merchant information at 604. The domestic merchant information at 604 includes categories of domestic merchants, domestic merchant name, domestic merchant geography, domestic merchant line of business, and the like. The domestic merchant information 604 also includes, for example, a domestic merchant identifier, geolocation of domestic merchant, and the like.

The payment card company retrieves, from one or more databases, domestic educational institution information of one or more domestic educational institutions at 606. The domestic educational institution information includes, for example, geolocation of educational institution, name of educational institution, curriculums at the educational institution, demographics of students attending the educational institution, and the like.

The payment card company optionally retrieves, from one or more databases, other information including demographic information (not shown in FIG. 6). The other information affords leveraged data sources that can supplement information in the first set of information, the second set of information, and the third set of information. Illustrative demographic information includes, for example, gender, age, income, education, and the like.

In step 608, the payment card company analyzes the first set of information from 602 and the second set of information from 604 to identify purchasing and payment activities of the one or more foreign payment card holders (e.g., students) by date at the one or more domestic merchants.

In step 610, the payment card company identifies shopping patterns of the one or more foreign payment card holders (e.g., students) at the one or more domestic merchants based on the purchasing and payment activities of the one or more foreign payment card holders by date at the one or more domestic merchants at 608.

The payment card company at 612 determines residential geolocation of the one or more foreign payment card holders based on the shopping patterns of the one or more foreign payment card holders at the one or more domestic merchants at 610.

In step 614, the payment card company analyzes the third set of information to identify geolocation of the one or more domestic educational institutions.

In step 616, the payment card company compares the residential geolocation of the one or more foreign payment card holders from 612 with geolocation of the one or more domestic educational institutions from 614 to determine a relative degree of proximity of the one or more foreign payment card holders with the one or more domestic educational institutions.

In step 618, the payment card company assesses the determined relative degree of proximity from 616 to facilitate determining whether the one or more foreign payment card holders are affiliated with the one or more domestic educational institutions.

In an embodiment, the payment card company analyzes the first set of information and the second set of information to identify one or more categories of domestic merchants based on domestic merchant line of business with the one or more categories of domestic merchants associated with the purchasing and payment activities of the one or more foreign payment card holders (e.g., students); and assesses purchasing and payment behavior of the one or more foreign payment card holders (e.g., students) at one or more domestic merchants based on the purchasing and payment activities of the one or more foreign payment card holders and the one or more categories of domestic merchants (not shown in FIG. 6).

In another embodiment, the payment card company generates a geolocation score that is indicative of the relative degree of proximity of the residential geolocation of the one or more foreign payment card holders with the geolocation of the one or more domestic educational institutions (not shown in FIG. 6).

In yet another embodiment, the payment card company generates an affluence score that is indicative of the purchasing and payment behavior of the one or more foreign payment card holders at one or more domestic merchants based on the purchasing and payment activities of the one or more foreign payment card holders and the one or more categories of domestic merchants (not shown in FIG. 6).

The payment card company conveys suggestions or recommendations to a domestic merchant to enable the domestic merchant to make targeted promotions or offers to the foreign payment card holders (e.g., students). In an embodiment, the payment card company conveys to the domestic merchant a spending behavioral propensity score based on the assessment. The score is indicative of a propensity of a potential foreign payment card purchaser to exhibit a certain behavior. The spending behavioral propensity score can be based on the geolocation score and/or the affluence score.

In an embodiment, the domestic merchant provides feedback to the payment card company to enable the payment card company to monitor and track impact of targeted promotions and offers. This "closed loop" system allows the domestic merchant to track promotional and advertising campaigns, measure efficiency of the targeting, and make any improvements for the next round of promotions or campaigns.

One or more algorithms can be employed to determine formulaic descriptions of the assembly of the foreign payment card holder information including foreign payment card holder purchasing and payment transactions, domestic merchant information, domestic educational institutional information, and optionally demographic information, using any of a variety of known mathematical techniques. These formulas, in turn, can be used to derive or generate assessments using any of a variety of available trend analysis algorithms.

An illustrative method in accordance with this disclosure is exemplified in FIGS. 7 and 8. In a first step, the difference between a tourist and a student is determined, in particular, the difference between a tourist payment card holder and a student payment card holder. The foreign payment cards are aggregated and for each foreign payment card, the maximum and minimum activity time span is determined in the United States within about a 9 month period to 3 years or so. FIG. 7 shows a representative sample of foreign payment cards, the activity time span between the first and last activities in the United States, the country of issuance of the foreign payment cards, and an assessment (i.e., confidence level) of the payment card holder being a student at a domestic educational institution. From FIG. 7, foreign payment cards 1 and 2 are marked with a high confidence that the foreign payment card holder is a student.

In a second step, purchasing and payment behavior of the one or more foreign payment card holders at one or more domestic merchants is assessed based on the purchasing and payment activities of the one or more foreign payment card holders and the one or more categories of domestic merchants. FIG. 8 shows multiple transactions for foreign payment cards 1 and 2 having a high confidence that the foreign payment card holder is a student. FIG. 8 shows the amount of the transaction, the domestic merchant name, the domestic merchant ZIP code, the domestic merchant category or industry, and the country of issuance of the foreign payment card. Based on the transactions, a modeling algorithm determines the university ZIP code will be 10002 and 90201 respectively for foreign payment cards 1 and 2. The model algorithm can be based on total concentrated segmented merchant spend, such as the top 80% of spend are within a small radius of a ZIP code. Since foreign payment card 1 has spent in the jewelry industry, which can be categorized as luxury, foreign payment card 1 will have a higher affluence score.

Based on the information in FIGS. 7 and 8, appropriate marketing strategies can be implemented and targeted specifically for foreign payment card holder (student) 1 and foreign payment card holder (student) 2. The marketing or advertising can be at a specific campus geolocation or a merchant geolocation.

In accordance with this disclosure, one or more predictive behavioral profiles are generated based at least in part on the first set of information, the second set of information, the third set of information, and optionally the fourth set of information. Predictive behavioral profiles can be selected based on the information obtained and stored in the one or more databases. The selection of information for representation in the predictive behavioral profiles can be different in every instance. In one embodiment, all information stored in each database can be used for selecting predictive behavioral profiles. In an alternative embodiment, only a portion of the information is used. The generation and selection of predictive behavioral profiles can be based on specific criteria.

Predictive behavioral profiles are generated from the information obtained from each database. The information is analyzed, extracted and correlated by, for example, a financial transaction processing company (e.g., a payment card company), and can include foreign payment card holder account information, domestic merchant information, domestic educational institution information, performing statistical analysis on foreign payment card holder account information, domestic merchant information and domestic educational institution information, finding correlations between account information, domestic merchant information, domestic educational institution information and foreign payment card holder behaviors, predicting future foreign payment card holder behaviors based on foreign payment card holder account information, domestic merchant information, domestic educational information, and the like.

Activities and characteristics attributable to the foreign payment card holders based on the one or more predictive behavioral profiles are identified. The foreign payment card holders have a propensity to carry out certain activities and to exhibit certain characteristics, based on the one or more predictive behavioral profiles. The activities and characteristics attributable to the foreign payment card holders and based on the one or more predictive behavioral profiles are conveyed by the financial transaction processing entity to the domestic merchant to take appropriate action, for example, making a targeted offer. This conveyance enables a targeted offer to be made by the domestic merchant to the foreign payment card holders. The transmittal can be performed by any suitable method as will be apparent to persons having skill in the relevant art.

Predictive behavioral profiles can be defined based on geographical or demographical information, including but not limited to, age, gender, income, marital status, postal code, income, spending propensity, and familial status. In some embodiments, predictive behavioral profiles can be defined by a plurality of geographical and/or demographical categories. For example, a predictive behavioral profile can be defined for any foreign payment card holder who engages in purchasing and spending activity.

Predictive behavioral profiles can also be based on behavioral variables. For example, the financial transaction processing entity database can store information relating to financial transactions. The information can be used to determine an individual's likeliness to spend at a particular date and time. An individual's likeliness to spend can be represented generally, or with respect to a particular industry, retailer, brand, or any other criteria that can be suitable as will be apparent to persons having skill in the relevant art. An individual's behavior can also be based on additional factors, including but not limited to, time, location, and season. The factors and behaviors identified can vary widely and can be based on the application of the information.

Behavioral variables can also be applied to generated predictive behavioral profiles based on the attributes of the entities. For example, a predictive behavioral profile of specific geographical and demographical attributes can be analyzed for spending behaviors. Results of the analysis can be assigned to the predictive behavioral profiles.

In an embodiment, the information retrieved from each of the databases can be analyzed to determine behavioral information of the foreign payment card holders. Also, information related to an intention of the foreign payment card holders can be extracted from the behavioral information. The predictive behavioral profiles can be based upon the behavioral information of the foreign payment card holders and the intent of the foreign payment card holders. The predictive behavioral profiles can be capable of predicting behavior and intent in the foreign payment card holders.

In analyzing information to determine behavioral information, intent and other foreign payment card holder attributes are considered. Developing intent of foreign payment card holders includes factoring in profiles that predict specific spend behavior at certain times in the future and desirable spend behaviors.

Predictive behavioral profiles can equate to purchase behaviors. There can be different degrees of predictive behavioral profiles with the ultimate behavior being a purchase.

The one or more predictive behavioral profiles are capable of predicting behavior and intent in the one or more foreign payment card holders. The one or more foreign payment card holders are people and, in particular, students; the activities attributable to the one or more foreign payment card holders are purchasing and spending transactions; and the characteristics attributable to the one or more foreign payment card holders are demographics and/or geographical characteristics.

A behavioral propensity score can be used for conveying to the entity the activities and characteristics attributable to the one or more foreign payment card holders based on the one or more predictive behavioral profiles. The behavioral propensity score is indicative of a propensity to exhibit a certain behavior.

Potential foreign payment card holders can represent a wide variety of categories and attributes. In one embodiment, potential foreign payment card holder categories can be created based on spending propensity in a particular industry. Industries can include, as will be apparent to persons having skill in the relevant art, restaurants (e.g., fine dining, family restaurants, fast food), apparel (e.g., women's apparel, men's apparel, family apparel), entertainment (e.g., movies, professional sports, concerts, amusement parks), accommodations (e.g., luxury hotels, motels, casinos), retail (e.g., department stores, discount stores, hardware stores, sporting goods stores), automotive (e.g., new car sales, used car sales, automotive stores, repair shops), travel (e.g., domestic, international, cruises), and the like. Each industry can include a plurality of potential foreign payment card holders (e.g., based on location, income groups, and the like).

A financial transaction processing company can analyze the generated predictive behavioral profiles (e.g., by analyzing the stored data for each entity comprising the predictive behavioral profile) for behavioral information (e.g., foreign payment card holder spend behaviors and propensities). In some embodiments, the behavioral information can be represented by a behavioral propensity score. Behavioral information can be assigned to each corresponding predictive behavioral profile.

Predictive behavioral profiles or behavioral information can be updated or refreshed at a specified time (e.g., on a regular basis or upon request of a party). Updating predictive behavioral profiles can include updating the entities included in each predictive behavioral profile with updated demographic data and/or updated financial data. Predictive behavioral profiles can also be updated by changing the attributes that define each predictive behavioral profile, and generating a different set of behaviors. The process for updating behavioral information can depend on the circumstances regarding the need for the information itself.

Although the above methods and processes are disclosed primarily with reference to financial data and foreign spending behaviors, it will be apparent to persons having skill in the relevant art that the predictive behavioral profiles can be beneficial in a variety of other applications. Predictive behavioral profiles can be useful in the evaluation of consumer data that may need to be protected.

The payment card company analyzes the first set of information, the second set of information, the third set of information, and optionally the fourth set of information to determine behavioral information of the foreign payment card holders. The payment card company extracts information related to intent of the foreign payment card holders from the behavioral information.

Figure 9:
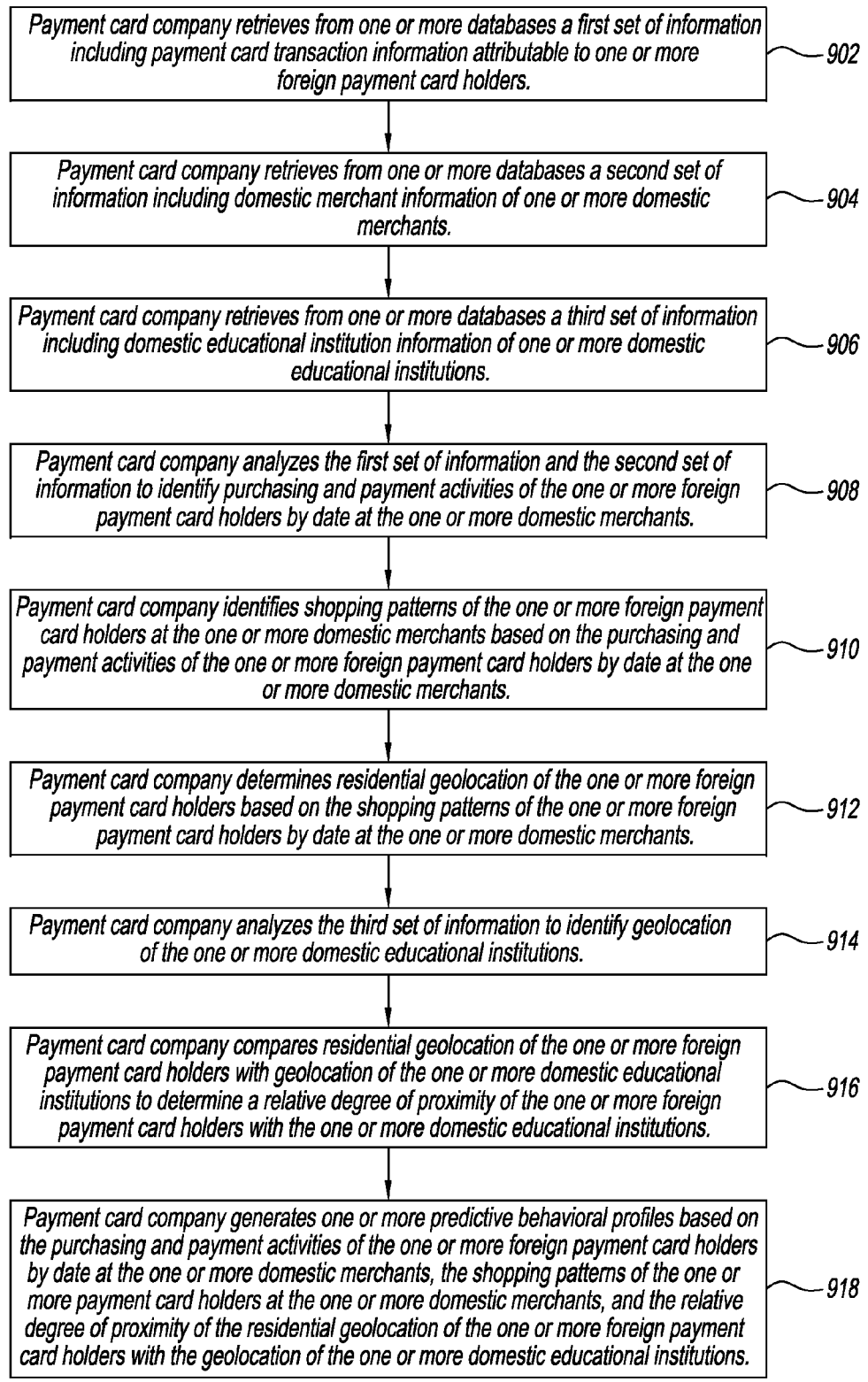
FIG. 9 is a block diagram illustrating a method for generating one or more predictive behavioral profiles in accordance with exemplary embodiments of this disclosure.

A method for generating one or more predictive behavioral profiles is an embodiment of this disclosure. Referring to FIG. 9, a payment card company (part of the payment card company network 150 in FIG. 1) retrieves at 902, from one or more databases, information including purchasing and payment information attributable to one or more foreign payment card holders. The information at 902 includes foreign payment card holder transaction information, foreign payment card holder information (e.g., payment card holder account identifier (likely anonymized), payment card holder geography (potentially modeled), payment card holder type (consumer/business), payment card holder demographics, and the like), and purchasing and payment activities attributable to foreign payment card holders. In particular, the information at 902 includes transaction dates, foreign payment card numbers, country of issuance of the payment card, transaction amounts, a transaction identifier, geolocation of payment card transaction, geolocation date on which payment card transaction occurred, geolocation time on which payment card transaction occurred, and the like.

The payment card company retrieves, from one or more databases, domestic merchant information at 904. The domestic merchant information at 904 includes categories of domestic merchants, domestic merchant name, domestic merchant geography, domestic merchant line of business, and the like. The domestic merchant information 904 also includes, for example, a domestic merchant identifier, geolocation of domestic merchant, and the like.

The payment card company retrieves, from one or more databases, domestic educational institution information of one or more domestic educational institutions at 906. The domestic educational institution information includes, for example, geolocation of educational institution, name of educational institution, curriculums at the educational institution, demographics of students attending the educational institution, and the like.

The payment card company optionally retrieves, from one or more databases, other information including demographic information (not shown in FIG. 9). The other information affords leveraged data sources that can supplement information in the first set of information, the second set of information, and the third set of information. Illustrative demographic information includes, for example, gender, age, income, education, and the like.

In step 908, the payment card company analyzes the first set of information from 902 and the second set of information from 904 to identify purchasing and payment activities of the one or more foreign payment card holders (e.g., students) by date at the one or more domestic merchants.

In step 910, the payment card company identifies shopping patterns of the one or more foreign payment card holders (e.g., students) at the one or more domestic merchants based on the purchasing and payment activities of the one or more foreign payment card holders by date at the one or more domestic merchants at 908.

The payment card company at 912 determines residential geolocation of the one or more foreign payment card holders based on the shopping patterns of the one or more foreign payment card holders at the one or more domestic merchants at 910.

In step 914, the payment card company analyzes the third set of information to identify geolocation of the one or more domestic educational institutions.

In step 916, the payment card company compares the residential geolocation of the one or more foreign payment card holders from 912 with geolocation of the one or more domestic educational institutions from 914 to determine a relative degree of proximity of the one or more foreign payment card holders with the one or more domestic educational institutions.

In step 918, the payment card company generates one or more predictive behavioral profiles based on the purchasing and payment activities of the one or more foreign payment card holders by date at the one or more domestic merchants with the shopping patterns of the one or more foreign payment card holders at the one or more domestic merchants, and the relative degree of proximity of the residential geolocation of the one or more foreign payment card holders with the geolocation of the one or more domestic educational institutions. The one or more foreign payment card holders have a propensity to carry out certain activities based on the one or more predictive behavioral profiles.

The payment card company identifies activities and characteristics attributable to foreign payment card holders (e.g., potential consumers) based on the predictive behavioral profiles. The activities and characteristics attributable to the foreign payment card holders based on the one or more predictive behavioral profiles are conveyed to an entity, to enable the entity, such as a domestic merchant, to make a promotion or targeted offer to the foreign payment card holders. In an embodiment, the payment card company conveys to the entity a behavioral propensity score based on the predictive behavioral profiles. The score is indicative of a propensity of a potential purchaser to exhibit a certain behavior.

Where methods described above indicate certain events occurring in certain orders, the ordering of certain events can be modified. Moreover, while a process depicted as a flowchart, block diagram, and the like can describe the operations of the system in a sequential manner, it should be understood that many of the system's operations can occur concurrently or in a different order.

The terms "comprises" or "comprising" are to be interpreted as specifying the presence of the stated features, integers, steps or components, but not precluding the presence of one or more other features, integers, steps or components or groups thereof.

Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it can be based on one or more other things as well. In other words, unless expressly indicated otherwise, as used herein "based on" means "based at least in part on" or "based at least partially on".

What is claimed is:

1. A method comprising:
    retrieving from one or more databases a first set of information comprising payment card transaction information attributable to one or more foreign payment card holders; wherein the payment card transaction information is generated via a computer in a payment card system from communications exchanged over a network between parties to transactions involving payment cards while the transactions are taking place;
    retrieving from one or more databases a second set of information comprising domestic merchant information of one or more domestic merchants;
    retrieving from one or more databases a third set of information comprising domestic educational institution information of one or more domestic educational institutions;
    analyzing the first set of information and the second set of information to identify purchasing and payment activities of the one or more foreign payment card holders by date at the one or more domestic merchants;
    identifying shopping patterns of the one or more foreign payment card holders at the one or more domestic merchants based on the purchasing and payment activities of the one or more foreign payment card holders by date at the one or more domestic merchants;
    determining residential geolocation of the one or more foreign payment card holders based on the shopping patterns of the one or more foreign payment card holders at the one or more domestic merchants;
    analyzing the third set of information to identify geolocation of the one or more domestic educational institutions;
    comparing residential geolocation of the one or more foreign payment card holders with geolocation of the one or more domestic educational institutions to determine a relative degree of proximity of the one or more foreign payment card holders with the one or more domestic educational institutions; and
    assessing the determined relative degree of proximity to facilitate determining whether the one or more foreign payment card holders are affiliated with the one or more domestic educational institutions.

2. The method of claim 1, further comprising:
    analyzing the first set of information and the second set of information to identify one or more categories of domestic merchants based on domestic merchant line of business, the one or more categories of domestic merchants associated with the purchasing and payment activities of the one or more foreign payment card holders; and
    assessing purchasing and payment behavior of the one or more foreign payment card holders at one or more domestic merchants based on the purchasing and payment activities of the one or more foreign payment card holders and the one or more categories of domestic merchants.

3. The method of claim 2, further comprising:
    generating an affluence score that is indicative of the purchasing and payment behavior of the one or more foreign payment card holders at one or more domestic merchants based on the purchasing and payment activities of the one or more foreign payment card holders and the one or more categories of domestic merchants.

4. The method of claim 2, further comprising:
    algorithmically generating an affluence score for the one or more foreign payment card holders based on the purchasing and payment activities of the one or more foreign payment card holders and the one or more categories of domestic merchants.

5. The method of claim 2, further comprising:
    targeting information including at least one or more suggestions or recommendations for foreign payment card holder spending or purchasing activity at one or more domestic merchants, based on the shopping patterns of the one or more foreign payment card holders at the one or more domestic merchants.

6. The method of claim 1, further comprising:
    generating a geolocation score that is indicative of a relative degree of proximity of the residential geolocation of the one or more foreign payment card holders with the geolocation of the one or more domestic educational institutions.

7. The method of claim 1, wherein the one or more foreign payment card holders comprise students at the one or more domestic educational institutions, and the one or more domestic educational institutions comprise universities and colleges.

8. The method of claim 1, further comprising:
    algorithmically generating a geolocation score that is indicative of a relative degree of proximity of the residential geolocation of the one or more foreign payment card holders with the geolocation of the one or more domestic educational institutions.

9. The method of claim 1, further comprising:
    retrieving from one or more databases a fourth set of information comprising demographic information of the one or more foreign payment card holders.

10. The method of claim 9, wherein:
    the first set of information comprises foreign payment card transaction dates and amounts, foreign payment card numbers, country of issuance of foreign payment card, foreign payment card holder demographic information, and domestic merchant information;
    the second set of information comprises domestic merchant name, domestic merchant geolocation, and one or more categories of domestic merchants based on domestic merchant line of business;

the third set of information comprises geolocation of the one or more domestic educational institutions; and the fourth set of information comprises financial status, age, gender, and interests in goods and services of the one or more foreign payment card holders.

11. The method of claim 10, further comprising creating one or more datasets to store information relating to the payment card transaction information attributable to one or more foreign payment card holders, the domestic merchant information of one or more domestic merchants, the demographic information of one or more foreign payment card holders, the shopping patterns of one or more foreign payment card holders at one or more domestic merchants, the residential geolocations of one or more foreign payment card holders, the geolocations of one or more domestic educational institutions, the relative degree of geolocation proximity of one or more foreign payment card holders with one or more domestic educational institutions, the affiliation of one or more foreign payment card holders with one or more domestic educational institutions, the geolocation scores, and the affluence scores.

12. The method of claim 11, wherein one or more datasets are constructed by statistical analysis selected from the group consisting of clustering, regression, correlation, segmentation, and raking.

13. The method of claim 1, further comprising determining whether the one or more foreign payment card holders are affiliated with the one or more domestic educational institutions based on one or more predictive behavioral profiles.

14. A system comprising:
 a computer in a payment card system;
 one or more databases configured to store a first set of information comprising payment card transaction information attributable to one or more foreign payment card holders; wherein the payment card transaction information is generated via the computer from communications exchanged over a network between parties to transactions involving payment cards while the transactions are taking place;
 one or more databases configured to store a second set of information comprising domestic merchant information of one or more domestic merchants;
 one or more databases configured to store a third set of information comprising domestic educational institution information of one or more domestic educational institutions;
 a processor configured to:
  analyze the first set of information and the second set of information to identify purchasing and payment activities of the one or more foreign payment card holders by date at the one or more domestic merchants;
  identify shopping patterns of the one or more foreign payment card holders at the one or more domestic merchants based on the purchasing and payment activities of the one or more foreign payment card holders by date at the one or more domestic merchants;
  determine residential geolocation of the one or more foreign payment card holders based on the shopping patterns of the one or more foreign payment card holders at the one or more domestic merchants;
  analyze the third set of information to identify geolocation of the one or more domestic educational institutions;
  compare residential geolocation of the one or more foreign payment card holders with geolocation of the one or more domestic educational institutions to determine a relative degree of proximity of the one or more foreign payment card holders with the one or more domestic educational institutions; and
  assess the determined relative degree of proximity to facilitate determining whether the one or more foreign payment card holders are affiliated with the one or more domestic educational institutions.

15. The system of claim 14, wherein the processor is configured to perform one of the following selected from the group consisting of:
 (a) analyze the first set of information and the second set of information to identify one or more categories of domestic merchants based on domestic merchant line of business, the one or more categories of domestic merchants associated with the purchasing and payment activities of the one or more foreign payment card holders; and
 assess purchasing and payment behavior of the one or more foreign payment card holders at one or more domestic merchants based on the purchasing and payment activities of the one or more foreign payment card holders and the one or more categories of domestic merchants;
 (b) generate a geolocation score that is indicative of a relative degree of proximity of the residential geolocation of the one or more foreign payment card holders with the geolocation of the one or more domestic educational institutions;
 (c) generate an affluence score that is indicative of the purchasing and payment behavior of the one or more foreign payment card holders at one or more domestic merchants based on the purchasing and payment activities of the one or more foreign payment card holders and the one or more categories of domestic merchants; and
 (d) retrieve from one or more databases a fourth set of information comprising demographic information of the one or more foreign payment card holders.

16. The system of claim 15, wherein:
the first set of information comprises foreign payment card transaction dates and amounts, foreign payment card numbers, country of issuance of foreign payment card, foreign payment card holder demographic information, and domestic merchant information;
the second set of information comprises domestic merchant name, domestic merchant geolocation, and one or more categories of domestic merchants based on domestic merchant line of business;
the third set of information comprises geolocation of the one or more domestic educational institutions; and
the fourth set of information comprises financial status, age, gender, and interests in goods and services of the one or more foreign payment card holders.

17. The system of claim 14, wherein the processor is configured to algorithmically generate a geolocation score that is indicative of a relative degree of proximity of the residential geolocation of the one or more foreign payment card holders with the geolocation of the one or more domestic educational institutions.

18. The system of claim 15, wherein the processor is configured to perform one of the following selected from the group consisting of:
(a) algorithmically generate an affluence score for the one or more foreign payment card holders based on the purchasing and payment activities of the one or more foreign payment card holders and the one or more categories of domestic merchants;
(b) target information including at least one or more suggestions or recommendations for foreign payment card holder spending or purchasing activity at one or more domestic merchants, based on the shopping patterns of the one or more foreign payment card holders at the one or more domestic merchants; and
c) determine whether the one or more foreign payment card holders are affiliated with the one or more domestic educational institutions based on one or more predictive behavioral profiles.

19. A method for generating one or more predictive behavioral profiles, the method comprising:
retrieving from one or more databases a first set of information comprising payment card transaction information attributable to one or more foreign payment card holders; wherein the payment card transaction information is generated via a computer in a payment card system from communications exchanged over a network between parties to transactions involving payment cards while the transactions are taking place;
retrieving from one or more databases a second set of information comprising domestic merchant information of one or more domestic merchants;
retrieving from one or more databases a third set of information comprising domestic educational institution information of one or more domestic educational institutions;
analyzing the first set of information and the second set of information to identify purchasing and payment activities of the one or more foreign payment card holders by date at the one or more domestic merchants;
identifying shopping patterns of the one or more foreign payment card holders at the one or more domestic merchants based on the purchasing and payment activities of the one or more foreign payment card holders by date at the one or more domestic merchants;
determining residential geolocation of the one or more foreign payment card holders based on the shopping patterns of the one or more foreign payment card holders at the one or more domestic merchants;
analyzing the third set of information to identify geolocation of the one or more domestic educational institutions;
comparing residential geolocation of the one or more foreign payment card holders with geolocation of the one or more domestic educational institutions to determine a relative degree of proximity of the one or more foreign payment card holders with the one or more domestic educational institutions; and
generating one or more predictive behavioral profiles based on the purchasing and payment activities of the one or more foreign payment card holders by date at the one or more domestic merchants, the shopping patterns of the one or more foreign payment card holders at the one or more domestic merchants, and a relative degree of proximity of the residential geolocation of the one or more foreign payment card holders with the geolocation of the one or more domestic educational institutions.

20. The method of claim 19, wherein the one or more predictive behavioral profiles comprise educational and/or shopping profiles of the one or more foreign payment card holders.

21. The method of claim 20, further comprising determining whether the one or more foreign payment card holders are affiliated with the one or more domestic educational institutions based on the one or more predictive behavioral profiles.

22. The method of claim 20, further comprising determining one or more associations between the one or more foreign payment card holders and the one or more domestic merchants based on the one or more predictive behavioral profiles.

23. The method of claim 19, further comprising assigning attributes to the one or more associations between the one or more foreign payment card holders and the one or more domestic merchants, wherein the attributes are selected from the group consisting of one or more of preference, confidence, time, and frequency.

* * * * *